United States Patent
Raabe et al.

[11] 3,728,340
[45] Apr. 17, 1973

[54] PIPERAZINE DERIVATIVES AND PROCESSES FOR THEIR MANUFACTURE

[75] Inventors: Thomas Raabe, Heusenstamm; Steffen Piesch, Oberursel; Klaus Resag; Rolf-Eberhard Nitz, both of Frankfurt (Main)-Fechenheim, all of Germany

[73] Assignee: Cassella Farbwerke Mainkur Aktiengesellschaft, Frankfurt Main, Germany

[22] Filed: Apr. 27, 1971

[21] Appl. No.: 137,997

[30] Foreign Application Priority Data

Apr. 30, 1970 Germany..................P 20 21 262.8

[52] U.S. Cl..............260/240 R, 424/250, 260/590, 260/592
[51] Int. Cl. ..........................................C07d 51/72
[58] Field of Search..............260/240 R, 293.62, 260/268 BC

[56] References Cited

UNITED STATES PATENTS

| | | | |
|---|---|---|---|
| 2,441,069 | 5/1948 | Hoffmann et al.............. | 260/293.62 |
| 3,454,565 | 7/1969 | Saffir et al. .................. | 260/240 R |

*Primary Examiner*—John D. Randolph
*Attorney*—Francis M. Crawford

[57] ABSTRACT

The present invention relates to new, pharmacologically valuable piperazine derivatives of the general formula

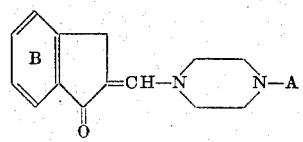

wherein
A means an alkyl or hydroxyalkyl radical having from one to four carbon atoms in the alkyl moieties, a benzhydryl or phenyl radical or one of the groups -COOR or

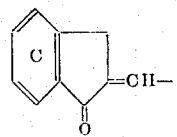

R representing alkyl having from one to four carbon atoms and the benzene rings B and/or C may be substituted by halogen
and to the production of such derivatives by reacting a compound of the general formula

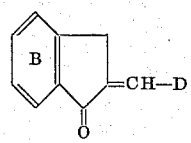

wherein D stands for ONa, OK, OH, Cl or Br with a piperazine compound of the general formula

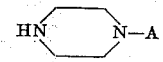

wherein A has the meaning given above, or by reacting, at a molar ratio of 2:1, a compound of the general formula

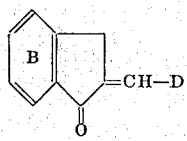

wherein D means ONa, OK, OH, Cl or Br with piperazine.

4 Claims, No Drawings

PIPERAZINE DERIVATIVES AND PROCESSES FOR THEIR MANUFACTURE

The present invention relates to new, pharmacologically valuable piperazine derivatives of the general formula

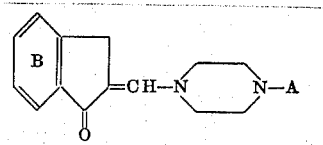

wherein

A means an alkyl or hydroxyalkyl radical having from one to four carbon atoms in the alkyl moieties, a benzhydryl or phenyl radical or one of the groups —COOR or

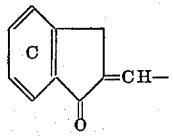

R representing alkyl having from one to four carbon atoms and the benzene rings B and/or C may be substituted by halogen, in particular by a chlorine atom.

The compounds of the present invention may be prepared for instance by the following reactions, the benzene rings B and/or C being possibly substituted, as already mentioned, by halogen and A having the above-given meaning:

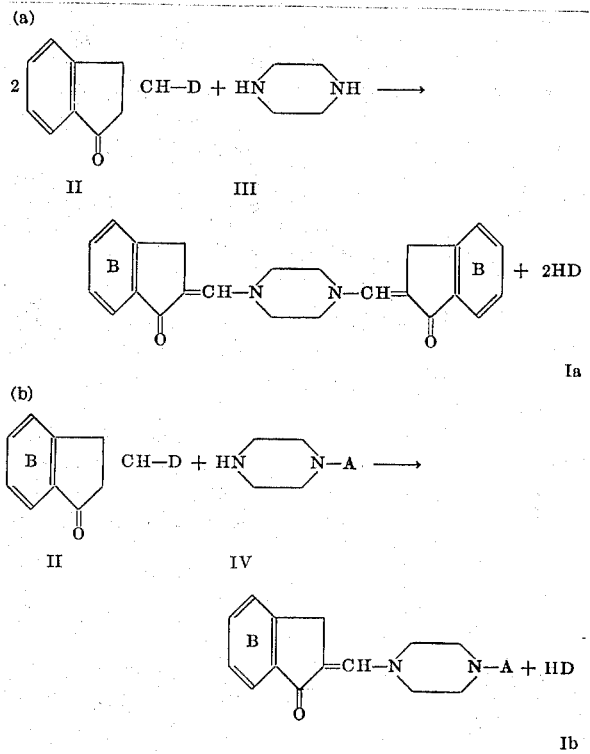

In the above formulas D stands for ONa or OK, OH, Cl or Br. The reactions are preferably carried out in a suitable solvent, such as ethanol, wherein the initial products are dissolved or suspended. In most of the cases the reactions are already carried out at room temperature. The compounds of the formulas III and IV may also be employed in the form of their salts, for instance in the form of their hydrochlorides or dihydrochlorides. In the reaction of the sodium or potassium salts of the 2-hydroxymethylene-indan-1-ones (D=ONa or OK in formula II) with salts of the compounds III or IV it is advisable to add a small amount of an acid such as hydrochloric acid, sulfuric acid, acetic acid or formic acid, so as to facilitate the reaction. If the sodium or potassium salts of the 2-hydroxymethylene-indan-1-ones are reacted with the free compounds III or IV, molar amounts of acids are added with a small excess. If 2-bromo or 2-chloromethylene-indanone-(1) (D=Cl or Br in formula II) is employed as starting material, hydrogen chloride or bromide splits off during the reaction which is preferably neutralized by the addition of molar amounts of a tertiary base such as triethylamine. If in the reactions (a) and (b) 2 mols of the compounds III or IV are employed, such addition of the tertiary base is unnecessary. In the reaction (a) the initial products react in the molar ratio of 2:1. Obtained are the compounds Ia of the present invention containing two identical indanone groups. According to the reaction (b), and if A stands for the group

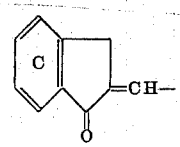

it is also possible to obtain compounds having the general formula

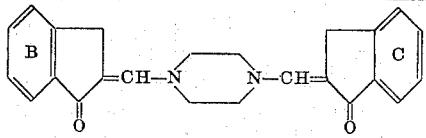

the benzene rings B and C being substituted in different ways by halogen.

As far as the initial products II and IV are unknown, they may be prepared according to different known per se methods. In the case of the compounds II, the sodium or potassium salts of the 2-hydroxymethylene-indan-1-ones for instance are easily obtained by an alkaline ester condensation of an indanone(1) which is possibly substituted at the benzene ring by halogen, with a methyl or ethyl formate. Thus it is possible to subject the following indanones to an alkaline ester condensation with formates:

7-chloroindanone-(1)
7-bromoindanone-(1)
4,6-dichloroindanone-(1)
4,7-dichloroindanone-(1)
5,7-dichloroindanone-(1)
4,5,6-trichloroindanone-(1)

It is possible to prepare by way of hydrolysis from the sodium or potassium salts of the 2-hydroxy-methylene-indan-1-ones the 2-hydroxy-methylene-indan-1-ones which may be converted into the 2-chloro or 2-bromo-methylene-indan-1-ones by way of a reaction with suitable chlorination or bromination agents such as thionylchloride, phosphorus trichloride or phosphorus tribromide.

The piperazine compounds IV wherein A stands for alkyl, hydroxyalkyl, benzhydryl, phenyl or alkoxycarbonyl (—COOR) are known. Suitable known piperazine compounds IV are for instance:
N-ethyl-piperazine
N-propyl-piperazine
N-isopropyl-piperazine
N-(3-hydroxypropyl)-piperazine
N-(2-hydroxypropyl)-piperazine
N-(4-hydroxybutyl)-piperazine
N-propoxycarbonyl-piperazine
Piperazine compounds wherein A stands for

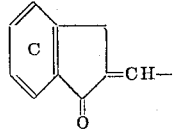

are obtained by reacting a compound of the formula

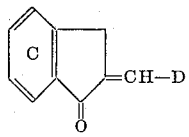

V wherein D means ONa OK, OH, Cl or Br and which may be prepared analogously to the compound II, either with a large excess of piperazine or with a piperazine one nitrogen atom of which is protected by a protective group such as a formyl or alkoxycarbonyl group which is eliminated after the reaction.

The piperazine derivatives of the present invention are valuable pharmaceuticals. Thus they possess for instance distinct anorectic properties and are superior to other known anorectics. Unlike the known anorectics which are accused of causing a pulmonary arterial hypertension, the compounds of the present invention involve, as is shown by a pharmacological investigation carried out in narcotized, artificially respired dogs with injection solutions of 1 – 5 mg./kg., no increase at all or only a slight increase in the tension in the pulmonary artery.

The piperazine derivatives of the present invention and their pharmaceutically acceptable salts may be employed in the preparation of pharmaceutical formulations such as tablets, dragees, suppositories, capsules, solutions, suspensions or emulsions. The pharmaceutical formulations may also contain other therapeutically valuable ingredients.

Tablets with a content of 5 to 80 percent by weight of essential active ingredient may be prepared with the conventional solid tabletting adjuvants such as lactose, wheat starch, microcrystalline starch, gelatin, talc, stearic acid, magnesium stearate and the like.

The following examples are given for the purpose of illustrating the present invention. All temperatures are given in degrees Centigrade.

EXAMPLE 1

3,2 g. 2-hydroxymethylene-indanone-(1) and 2,88 g. N-carbmethoxypiperazine are suspended in 15 c.c. ethanol, one drop of formic acid is added and the mixture is stirred during 20 hours at room temperature. The insolute is then separated with suction, washed with little ethanol and the residue is recrystallized from toluene. Thus obtained is the 2-(4'-methoxycarbonyl-piperazinomethylene)-indanone-(1) melting at 175°–178°.

($C_{16}H_{18}N_2O_3$ calc.: N 9.8 found: 9.7)

Yield: 3,1 g. = 54 percent of the theoretical.

The 2-hydroxymethylene-indanone-(1) and its sodium salt may be prepared as follows:

50 g. sodium methylate are suspended in 700 c.c. anhydrous toluene. At an internal temperature of 10° a mixture consisting of
100 g. indanone-(1)
70 g. ethyl formate and
200 c.c. anhydrous toluene
is added dropwise to the suspension while stirring during 2 hours. Stirring is continued for another 4 hours at 20°. By sucking off the sodium salt of the 2-hydroxymethylene-indanone-(1) is obtained which may be used after drying for the preparation of the compounds of the present invention.

If one intends to obtain from the sodium salt the free 2-hydroxymethylene-indanone-(1) one either dissolves the sodium salt in 1 liter water or adds 1 liter water without isolating the sodium salt from the toluene solvent, which is thoroughly mixed with the aqueous phase the latter being subsequently separated. The aqueous solution is cleared with activated charcoal and the $p_H$ value is adjusted to 5 by the addition of approx. 200 c.c. of a 50 percent acetic acid. The 2-hydroxymethylene-indanone-(1) separates in the form of colorless needles which are then sucked off, washed with water until neutral and dried.

Yield: 95 g. = 78 percent of the theoretical, melting point 112°.

The 2-(4'-methoxycarbonyl-piperazino-methylene)-indanone-(1) is also obtained with a good yield by reacting in toluene 2-chloromethylene-indanone-(1) and N-methoxycarbonyl-piperazine.

EXAMPLE 2

7,3 g. sodium salt of the 2-hydroxymethylene-indanone-(1) and 3,2 g. piperazine dihydrochloride are suspended in 30 c.c. ethanol and stirred during 20 hours at room temperature. The reaction mixture is then sucked off and the residue is washed with water. After recrystallizing from dimethylformamide one obtains the N,N'-di-[2-methylene-indanone-(1)]-piperazine melting at 312° with decomposition.

($C_{24}H_{22}N_2O_2$ calc.: N 7.6 found: 7.2)

Yield: 4.8 g. = 65 percent of the theoretical.

Analogously to the descriptions given in Example 1 and 2 the following compounds of the present invention may be obtained:

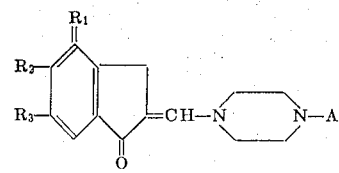

| $R_1$ | $R_2$ | $R_3$ | A | M.P. |
|---|---|---|---|---|
| H | Cl | Cl | —CH= (dichlorophenyl ring) | Decomposition above 300° C. |
| H | H | H | —COOC$_2$H$_5$ | 118–120° C. |
| H | H | Cl | —COOC$_2$H$_5$ | 70° C. |
| Cl | H | H | —COOC$_4$H$_9$ | 188° C. |
| H | H | H | —CH$_3$ | Decomposition (hydrochloride) from 163° C. |
| H | H | H | —C$_4$H$_9$ | 108° C. |
| H | H | H | —CH (diphenyl) | 219° C. |

| R₁ | R₂ | R₃ | A | M.P. |
|---|---|---|---|---|
| H | Cl | Cl | 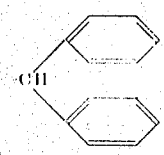 | 144° C. |
| H | H | H | —CH₂—CH₂—OH | 64° C. |
| Cl | H | H | —C₆H₅ | 163° C. |
| Cl | H | H | 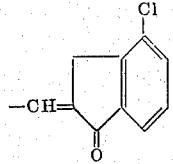 | Decomposition above 300° C. |
| H | H | Cl | 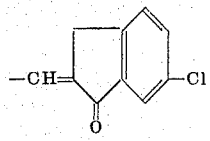 | Same as above. |

What we claim is:

1. A piperazine derivative of the formula

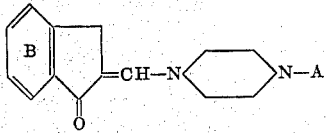

wherein A is selected from the groups consisting of —COOR and

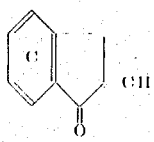

R representing alkyl having from one to four carbon atoms and where the benzene rings B and/or C may be substituted by halogen.

2. Piperazine derivatives according to claim 1, characterized in that the benzene ring B and/or C is substituted by chlorine.

3. Piperazine derivative of the formula

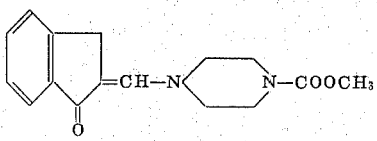

4. Piperazine derivative of the formula

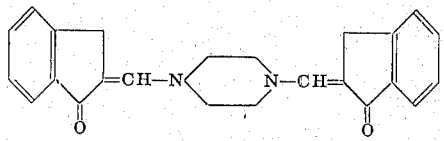

* * * * *